(No Model.) 2 Sheets—Sheet 1.
J. T. BRIEN.
WATER TRAP.
No. 476,224. Patented May 31, 1892.
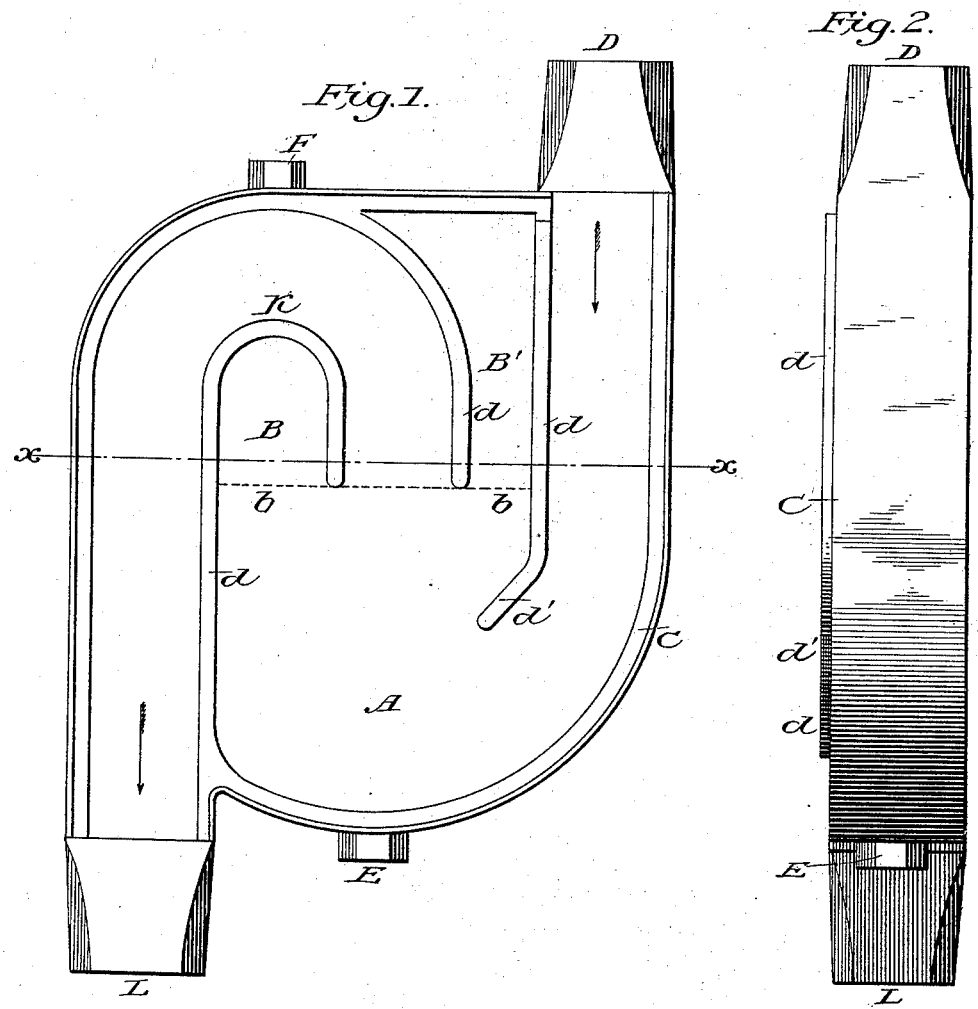
Witnesses.
Inventor.

(No Model.) 2 Sheets—Sheet 2.

J. T. BRIEN.
WATER TRAP.

No. 476,224. Patented May 31, 1892.

Witnesses. Inventor.

UNITED STATES PATENT OFFICE.

JAMES T. BRIEN, OF HOOSICK FALLS, NEW YORK.

WATER-TRAP.

SPECIFICATION forming part of Letters Patent No. 476,224, dated May 31, 1892.

Application filed September 7, 1891. Serial No. 405,066. (No model.)

*To all whom it may concern:*

Be it known that I, JAMES T. BRIEN, of Hoosick Falls, in the county of Rensselaer and State of New York, have invented certain new and useful Improvements in Water-Traps, which improvements are fully set forth in the following specification, reference being had to the accompanying drawings, in which—

Figure 4:
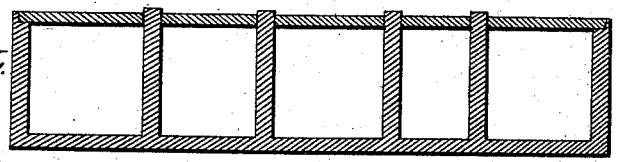
Figure 3:
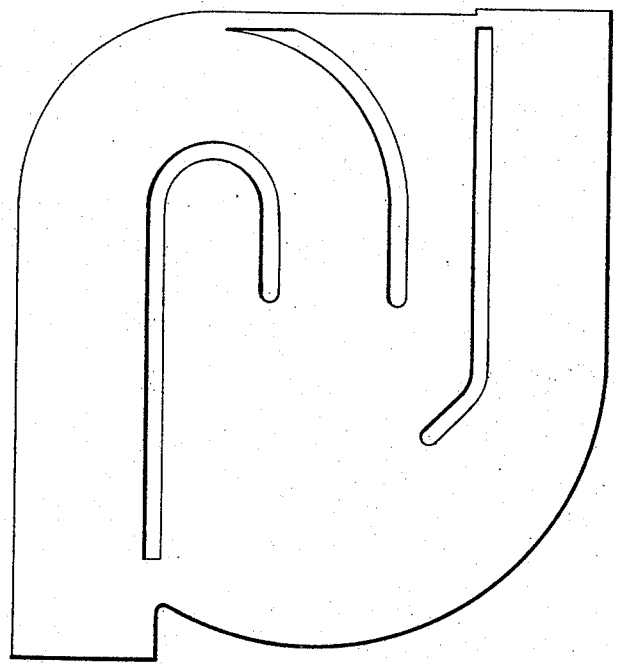

Figure 1 is a side view with cover or cap-plate 3 removed. Fig. 2 is an end view of the same; Fig. 3, the cover or cap-plate that fits onto the body of the trap shown in Fig. 1; and Fig. 4 is a cross-section of the trap on the line $x\,x$, Fig. 1.

Similar letters of reference indicate corresponding parts in the several figures.

D is the entrance where the water enters the trap.

A is the body of the trap.

E is a hand-hole to clean out the trap.

F is an opening to attach a ventilator-pipe.

B and B' are air-chambers. Said air-chambers can be one or more.

$d$ and $d'$ are partitions inside of the trap, so made as to form the air-chambers. $d'$ is carried down and inclined forward for the purpose, so forming a trap-chamber below the S-trap and below the air-chambers, so that gas cannot pass $d'$ and water cannot be siphoned out.

H H are apertures in the cover, through which the partitions $d$ and $d'$ pass, also the rim of the body A, (shown as $c$,) and are made deeper, so that the former will pass through the cover and the rim be flush with it, as shown in Fig. 4. I consider this construction more convenient and cheaper to manufacture and much easier to be sealed air-tight.

The object of this invention is to obtain a simple and efficient water-trap, doing away with checks and balls and securing what I call a "non-siphon trap." With the ordinary trap where there is any head the water is apt to run all out of the trap, thereby allowing sewer-gas to come up through the trap into the house.

The operation of my invention is as follows: The water enters at D, passes into the body of the trap A, and rises to the dotted line $b$, sealing the air-chambers B and B', and keeps rising until it arrives at K before it discharges through L. It will be seen that the water cannot be siphoned out of this trap, as the unsealing of the air-chambers B and B' causes a break in the siphon and stops the flow of the water, while the main trap-chamber A is still nearly full, the partition $d'$ forming a trap still lower than the S-trap and preventing the return of gas after the S-trap has been siphoned. In case sewer-gas should come up into the trap, when it reached it it would rise into the air-chambers B and B'. If any should go below B B', it would strike the partition-wall $d'$ and rise into the air-chambers B B' or to the top of the trap.

What I claim is—

The combination, with the receiving-bowl of a trap, of a siphonic discharge-pipe, an induction-pipe, the mouth of the latter extended below that of the former, and an inclosed air-chamber sealed at the bottom intermediate the discharge and induction pipes, whereby the air from the chamber breaks or cuts off the siphonic discharge before the water reaches the level of the mouth of the inlet-pipe, as specified.

JAMES T. BRIEN.

Witnesses:
JOHN C. HASWELL,
CEPHAS D. KINSLEY.